United States Patent [19]

Cox et al.

[11] Patent Number: 4,972,680

[45] Date of Patent: Nov. 27, 1990

[54] CONVERSION KIT FOR VEHICLE AIR CONDITIONING CIRCUIT SUCTION THROTTLING VALVES

[76] Inventors: Richard G. Cox, 5101 Springlake Pkwy., Apt. 413, Fort Worth, Tex. 76117; Darrow W. Cowart, 5702 Fireside Dr., Arlington, Tex. 76016

[21] Appl. No.: 412,940

[22] Filed: Sep. 26, 1989

[51] Int. Cl.$^5$ .............................................. F25B 1/00
[52] U.S. Cl. ..................... 62/227; 62/323.4
[58] Field of Search ....................... 62/217, 227, 323.4

[56] References Cited

U.S. PATENT DOCUMENTS

| | | | |
|---|---|---|---|
| 3,452,929 | 7/1969 | Douglas | 236/80 |
| 3,525,324 | 8/1970 | Widdowson | 62/217 |
| 4,334,255 | 6/1982 | Izumi | 62/323.4 |
| 4,526,157 | 7/1985 | Theofanous | 123/595 |
| 4,800,737 | 1/1989 | Smith et al. | 62/503 |
| 4,829,777 | 5/1989 | Matsuoka | 62/227 |

Primary Examiner—William E. Wayner
Attorney, Agent, or Firm—Melvin A. Hunn

[57] ABSTRACT

An update kit allows the conversion of a suction throttling valve of a vehicle air conditioning circuit, from a mechanically operated switch to an electrically actuated thermostatic switch, without destroying the authenticity of the air conditioning circuit. The kit includes a substantially rigid planar plate for coupling in the suction throttling valve in place of a diaphragm, a gasket for coupling adjacent to the planar rigid plate to prevent leakage of refrigerant, a thermostatic electrical switch having a flexible elongated temperature probe from coupling to the vehicle adjacent to the evaporator with the flexible elongated temperature probe in contact with the evaporator, a faster means for securing the elongated temperature probe in place, thermally insulating tape for wrapping around the flexible elongated temperature probe, and a conductor means for electrically coupling the thermostatic electrical switch to the clutch cycling system of the vehicle.

5 Claims, 6 Drawing Sheets

CONVERSION KIT FOR VEHICLE AIR CONDITIONING CIRCUIT SUCTION THROTTLING VALVES

BACKGROUND OF THE INVENTION

1. Field of the Invention

This invention relates generally to vehicle air conditioning systems, and specifically to conversion kits for vehicle air conditioning valves.

2. Description of the Prior Art

Many older American and British automobiles have become collector's items, and are referred to by many as "classic cars." One goal of classic car collectors is to maintain the vehicle in excellent operating condition, with as many original parts as possible. Owners of classic cars frequently show their vehicles in competitions in which the cars are judged on appearance, operating condition, and authenticity (e.g., whether the vehicle has original parts.)

The preservation of authenticity of a classic car is often an expensive and challenging task, due in large part to the scarcity of certain authentic parts. The restoration and preservation of vehicles is especially difficult when the original part is prone to failure.

The air conditioning system of certain General Motors Corporation vehicles in the years 1962 through 1965 contain a suction throttling valve which serves to prevent icing of the air conditioning system evaporator, but which is prone to failure. Similar valve problems ar also found on other vehicle models, including 1962-1966 Corvettes and GM heavy trucks and Rolls Royces from 1962 through 1976. Repeated replacement of the suction throttling valve can be prohibitively expensive, since the original part (and reproductions thereof) is in short supply.

SUMMARY OF THE INVENTION

It is one object of the present invention to improve the operating performance of the air conditioning system of certain classic cars, without destroying the authenticity of the classic car.

It is another object of the present invention to update the air conditioning system of certain classic cars with an electrically operated de-icing switch.

It is yet another object of the present invention to provide a conversion kit for substituting an electrically operated thermostatic switch in place of a suction throttling valve, in the air conditioning systems of certain classic vehicles.

The foregoing and additional objects are achieved as follows. In classic cars, a suction throttling valve is positioned in the air conditioning circuit between the evaporator and the compressor. The suction throttling valve includes a valve body having an inlet for coupling to the evaporator and receiving low pressure gaseous refrigerant discharge from the evaporator, and an outlet for coupling to the suction intake of the compressor. A chamber interconnects the inlet and the outlet of the valve body. A piston is disposed in the chamber, and is adjustable in position within the chamber to control the flow of refrigerant between the inlet and the outlet of the valve body. An adjustment spring housing is releasable coupled to the valve body. An adjustment spring is disposed in the housing. A diaphragm is coupled between the valve body and the adjustment spring housing, and is deformable in shape in response to the sum of forces from the adjustment spring on one side and the refrigerant pressure in the evaporator on the other side. The diaphragm abuts the piston in the chamber to control the flow of refrigerant between the inlet and the outlet by adjusting the position of the piston within the chamber.

An altitude compensation assembly couples to the adjustment spring housing, and includes a vacuum chamber coupled to a vehicle vacuum line, a vent chamber coupled to atmospheric pressure, a flexible barrier disposed between the vacuum and vent chambers, a rod extending through the adjustment spring housing and abutting the diaphragm at one end and the flexible barrier at the opposite end. A spring is included for biasing the flexible barrier inward and urging the rod to act upon the diaphragm in supplementation to the adjustment spring. Changes in altitude are automatically accommodated by the altitude compensation assembly.

The conversion kit for modifying the suction throttling valve includes a number of components. A substantially planar rigid plate is provided for coupling in the suction throttling valve in place of the diaphragm between the valve body and the adjustment spring housing, after removal of the diaphragm and the piston from the suction throttling valve. A gasket is provided for coupling between the valve body and the adjustment spring housing adjacent to the substantially planar rigid plate, to prevent leakage of refrigerant from the valve body. A thermostatic electrical switch having a flexible elongated temperature probe is provided for coupling to the vehicle adjacent to the evaporator, with the flexible elongated temperature probe in contact with the evaporator. The thermostatic electrical switch is actuated in response to the temperature of the evaporator as sensed by the flexible elongated temperature probe. A fastener is provided for securing the elongated temperature probe in place on the evaporator. Thermally insulating tape is provided for wrapping around the flexible elongated temperature probe when coupled to the evaporator, to thermally insulate the flexible elongated temperature probe and ensure accurate measurement of evaporator temperature. A conductor means is provided for electrically coupling the thermostatic electrical switch to the electrically actuated clutch cycling system of the vehicle, allowing the thermostatic electrical switch to disengage the compressor when the temperature of the evaporator falls below a selected level to prevent icing of the evaporator.

The above as well as additional objects, features, and advantages of the invention will become apparent in the following detailed description.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
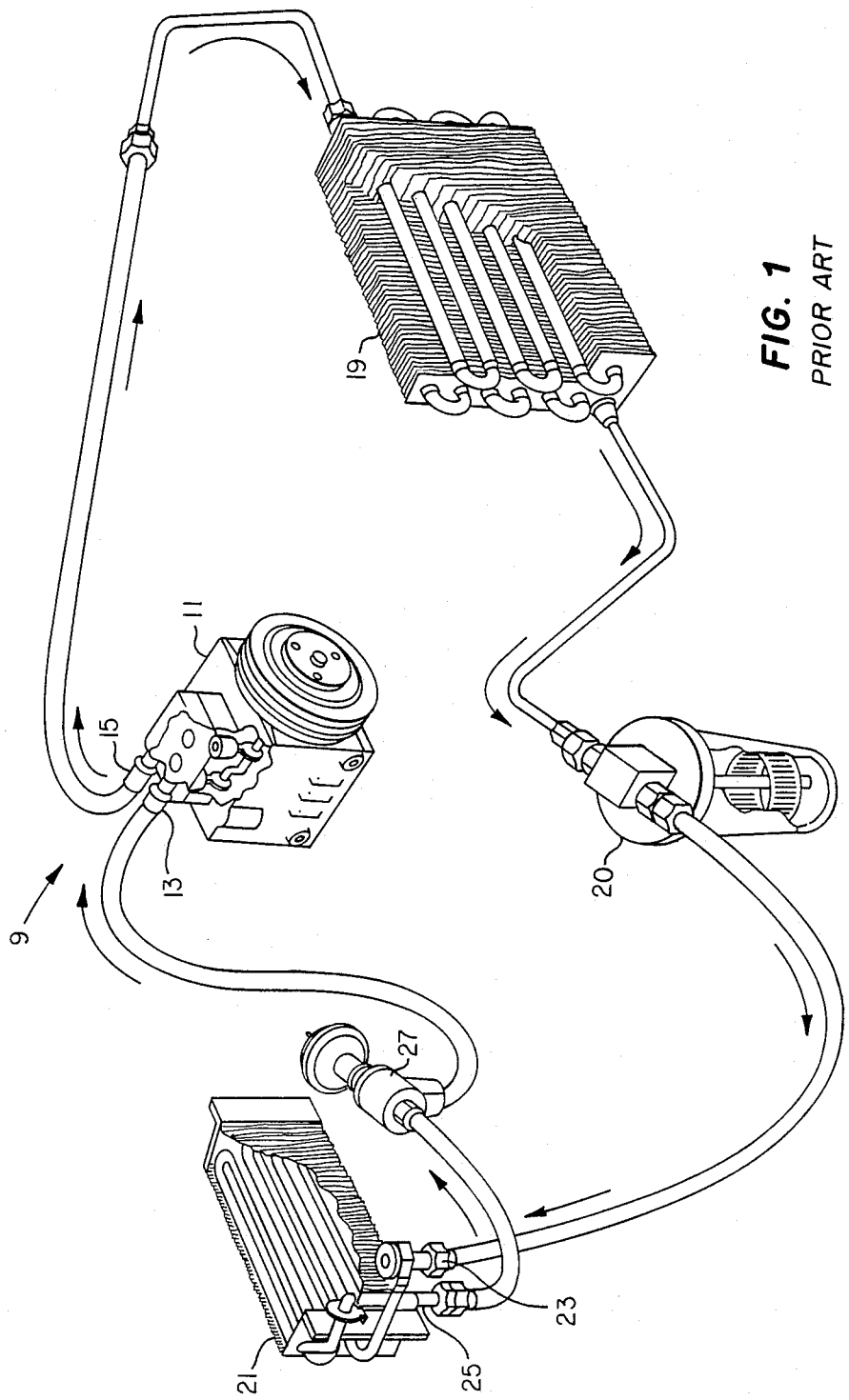
FIG. 1 is a simplified view of a prior art vehicle refrigeration circuit.

With reference now to the figures and in particular with reference to FIG. 1,

FIG. 1 is a simplified view of a prior art vehicle air conditioning refrigeration circuit 9. Compressor 11 is provided for pressurizing a refrigerant, and has a suction intake 13 for receiving low pressure refrigerant in gaseous form, and an output 15 for discharging high pressure refrigerant in gaseous form. Compressor 11 also includes an electrically actuated clutch cycling system 17 (not shown in FIG. 1, but shown in FIG. 6) for engaging and disengagig the compressor in response to changes in air conditioning temperature sensed by a temperature sensor located in the vehicle.

The automotive air conditioning refrigeration circuit 9 also includes condenser 19, which is coupled to compressor 11 for receiving high pressure refrigerant in gaseous form from output 15 and for discharging high pressure refrigerant in liquid form. Usually, refrigerant is routed from condenser 19 to a dryer 20 which serves to remove water or water vapor from the refrigerant.

The refrigerant is then routed to evaporator 21 through expansion valve 23. Evaporator 21 receives high pressure liquid refrigerant from condenser 19, and discharges refrigerant in the form of a low pressure gas from outlet tube 25.

In automobiles manufactured by General Motors Corporation between 1962 and 1965, outlet tube 25 of evaporator 21 is coupled to compressor 11 through suction throttling valve 27. Suction throttling valve 27 operates as a de-icing valve. It operates to maintain the temperature of the refrigerant in evaporator 21 above the freezing point of water. If the refrigerant in evaporator 21 falls below 32° F., water vapor present in the atmosphere tends to accumulate on evaporator 21 and freeze. For the air conditioning refrigerant, temperature and pressure are closely related. A rise in pressure indicates a rise in temperature. A decrease in pressure indicates a decrease in temperature. Suction throttling valve 27 operates by monitoring and regulating the pressure of evaporator 21.

In other words, the suction throttling valve 27 controls the evaporator 21 temperature by limiting the minimum pressure of the refrigerant in evaporator 21 to prevent freezing the condensate. The prevention of evaporator 21 freeze-up is important because any obstruction to the flow of air through evaporator 21 reduces the cooling effect of the system.

Figure 2:
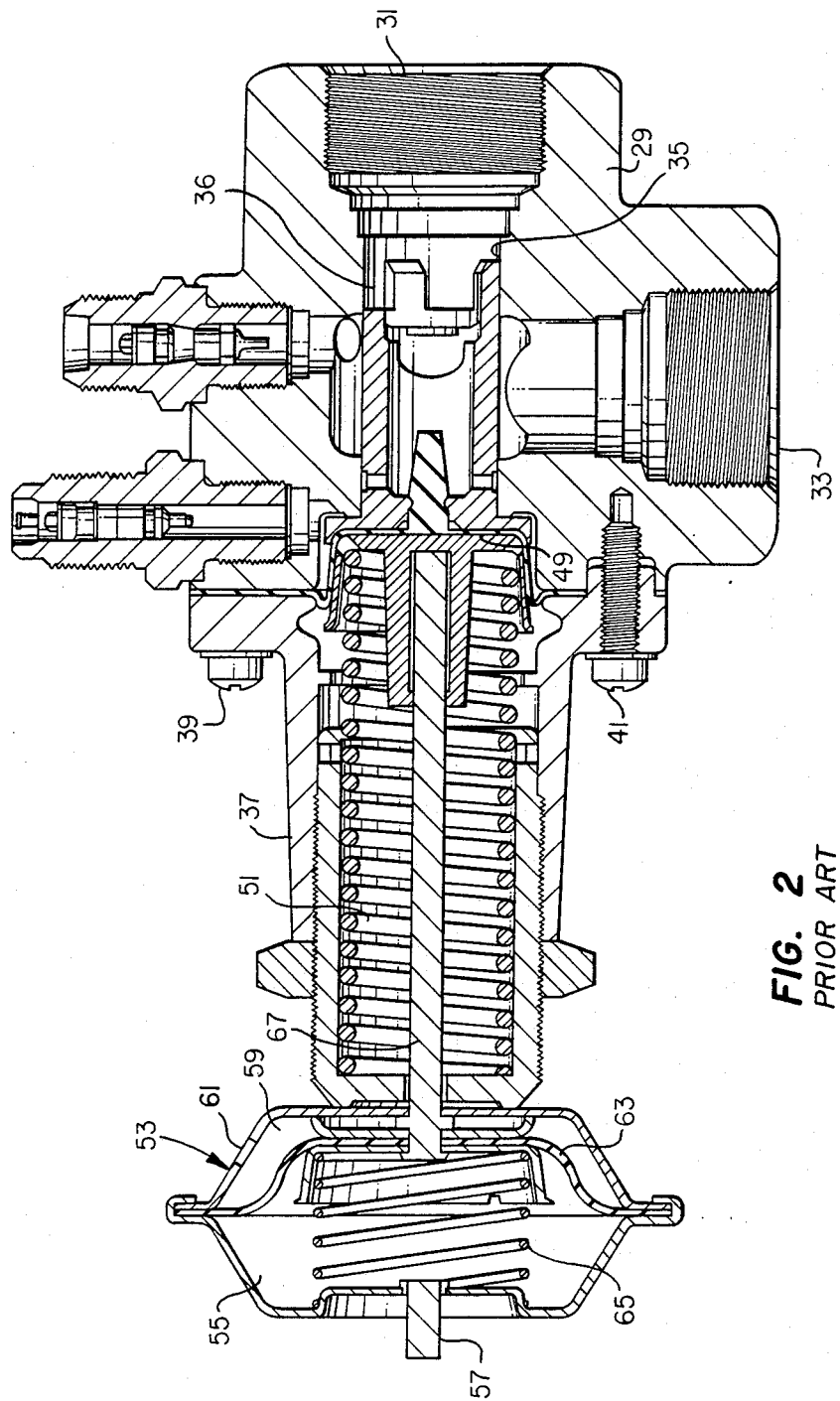
FIG. 2 is a cross-section view of a prior art suction throttling valve.

FIG. 2 is a cross-section view of suction throttling valve 27. Suction throttling valve 27 includes valve body 29 having inlet 31 for coupling to evaporator 21 and receiving low pressure gaseous refrigerant discharge from evaporator 21. Valve body 29 also includes outlet 33 for coupling to the suction intake 13 of compressor 11. Inlet 31 and outlet 33 are interconnected by chamber 35.

Piston 36 is disposed in chamber 35, and is adjustable in position within chamber 35 to control the flow of refrigerant between inlet 31 and outlet 33 of valve body 29.

Adjustment spring housing 37 is releasably coupled to valve body 29 by bolts 39, 41, 43, 45, and 47 (bolts 43, 45, and 47 are not shown in FIG. 2). Adjustment spring 51 is disposed within adjustment spring housing 37.

Diaphragm 49 is coupled between valve body 29 and adjustment spring housing 37. Diaphragm 49 is deformable in shape in response to the sum of forces from adjustment spring 51 on one side, and refrigerant pressure from evaporator 21 on the other side. Diaphragm 49 abuts 36 in chamber 35 to control the flow of refrigerant between inlet 31 and outlet 33 by adjusting the position of piston 36 within chamber 35.

Essentially, suction throttling valve 27 operates by balancing spring pressure against the evaporator pressure. In operation, the flow of refrigerant from evaporator 21 to compressor 11 is controlled by the position of piston 36 within valve body 29. The position of piston 36 is determined by the balance of forces that is applied to diaphragm 49. Low pressure refrigerant vapor flows into suction throttling valve 27 at inlet 31. A very small part of the refrigerant is diverted to the inside of piston 36 through holes drilled in the piston wall (not shown). The pressure caused by this refrigerant is transmitted to the inner side of diaphragm 49, allowing it to sense the actual pressure of refrigerant in evaporator 21. The evaporator pressure thus applied on the inner side of diaphragm 49 is balanced and opposed by the spring load, plus the atmospheric pressure applied to the outer surface of diaphragm 49 by altitude compensation assembly 53. (Discussed herebelow). An increase of pressure in the evaporator 21 will cause piston 36 to move against diaphragm 49, opposing spring pressure and opening the valve, to allow more vapor to flow through to the compressor. This allows the compressor to lower the evaporator 21 pressure, which in turn allows piston 36 to close as required to maintain the proper pressure. The pressure of evaporator 21 is thus controlled by "throttling" the suction line when the evaporator pressure drops below the established setting. When refrigerant flow is thus restricted, evaporator 21 pressure will rise because of the boiling off of the refrigerant. As the pressure increases above the valve setting, the valve will be caused to open as required to lower the pressure to the proper level.

Altitude compensation assembly 53 cooperates with adjustment spring 51 to act on diaphragm 49. Altitude compensation assembly 53 includes vacuum chamber 55 which is coupled to a vehicle vacuum line 57, and vent chamber 59 which is coupled to atmospheric pressure at vent 61. Alternative designs can use a mechanically operated cable arrangement or electrically operated device in place of the vacuum line 57 to perform a similar function. Flexible barrier 63 is disposed between vacuum chamber 55 and vent chamber 59. Assist spring 65 biases flexible barrier 63 inward. Rod 67 extends through adjustment spring housing 37, and abuts diaphragm 49 at one end, and is coupled to flexible barrier 63 at the opposed end. Changes in altitude cause flexible barrier 63 to move inward and outward, moving rod 67 inward and outward to act upon diaphragm 49 in supplementation to adjustment spring 51. Changes in altitude are automatically accommodated by altitude compensation assembly 53.

Figure 3:
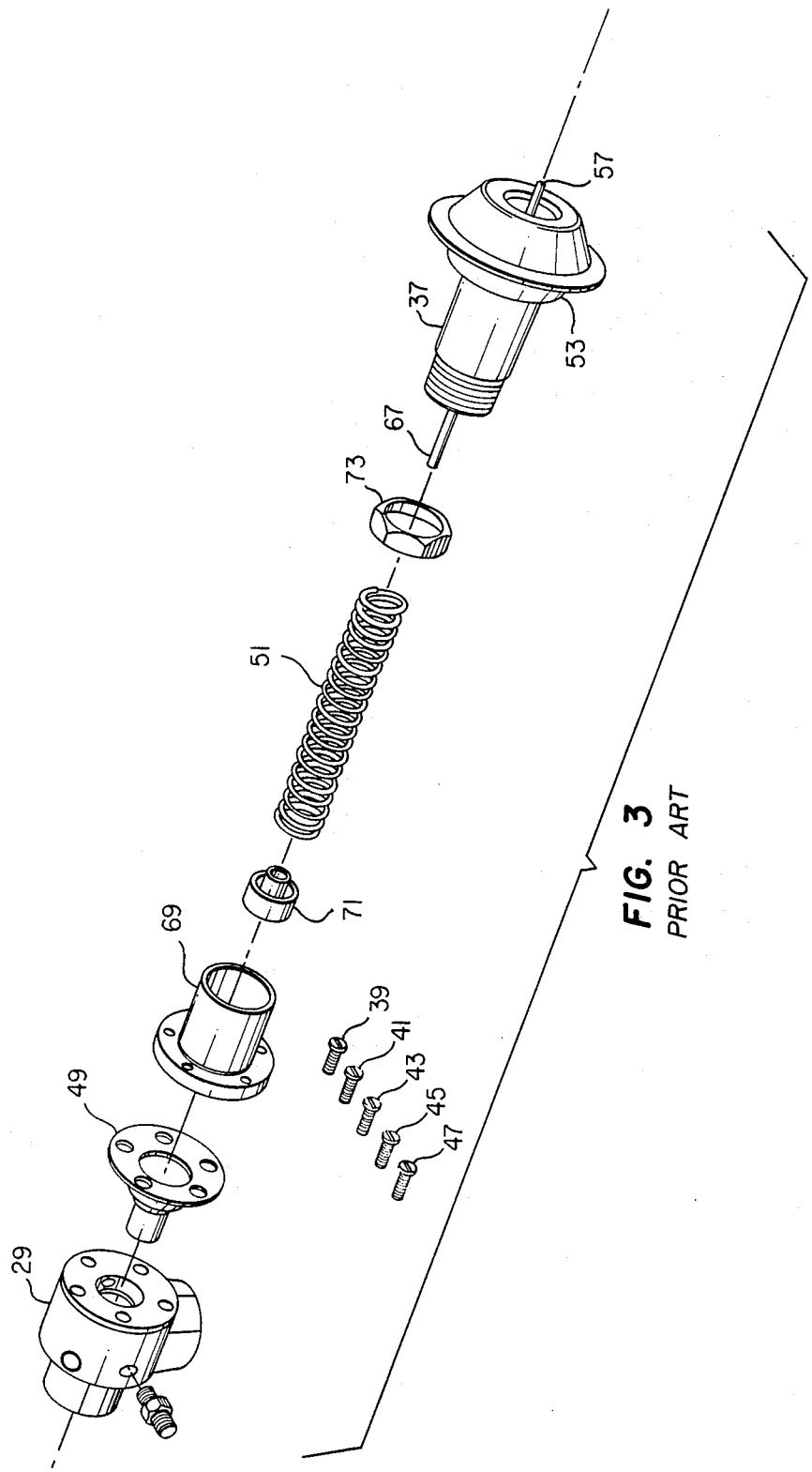
FIG. 3 is an exploded view of a prior art suction throttling valve.

FIG. 3 is an exploded view of suction throttle valve 27. Valve body 29 interconnects with piston diaphragm 49. Diaphragm cover 69 protects diaphragm 49. Spring seat 71 coupled to diaphragm cover 69, and serves to receive one end of adjustment spring 51. Adjustment spring housing 37 is shown coupled to altitude compensation assembly 53. Rod 67 is also shown. Jam nut 73 serves to couple adjustment spring housing 37 to diaphragm cover 69 and allows for the adjustment of the temperature/pressure threshold for suction throttling valve 27 by allowing adjustment of the force of adjustment spring 51.

Figure 4:
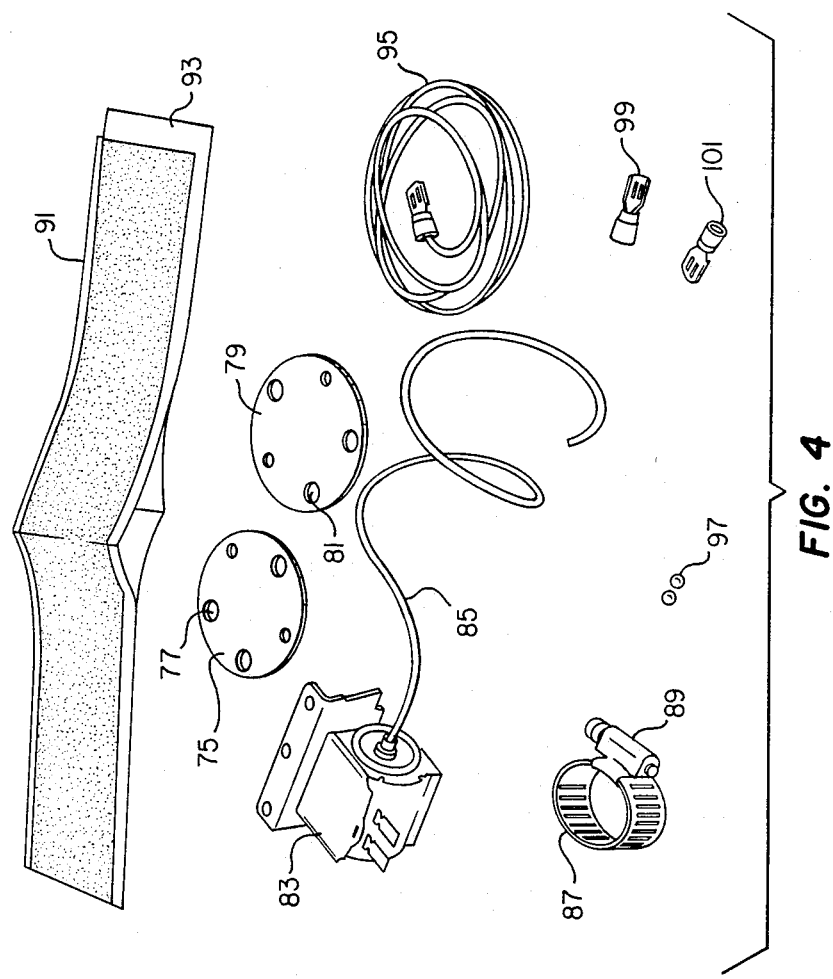
FIG. 4 is a perspective view of the conversion kit of the present invention.

FIG. 4 is a perspective view of the components which cooperate to make up the kit of the present invention. Planar rigid plate 75 is formed of a light-weight metal, such as aluminum. Plate 75 is circular in shape, and adapted to be of approximately the same size as the diaphragm 49. A plurality of mounting ports 77 are provided in planar rigid plate 75. In the preferred embodiment, five mounting ports 77 are provided, one for each bolt 39, 41, 43, 45, and 47, thus allowing planar rigid plate 77 to be coupled in suction throttling valve 27 in the place of diaphragm 49 between valve body 29 and adjustment spring housing 37, after removal of diaphragm 49 and piston 36 from suction throttling valve 27. Gasket 79 is provided for coupling between valve body 29 and adjustment spring housing 37. Gasket 79 is placed adjustment to a substantially planar rigid plate 75 to prevent leakage of refrigerant from valve body 29. Like planar rigid plate 75, gasket 79 has a plurality of mounting ports 81 to accommodate bolt 39, 41, 43, 45, and 47.

The kit also includes thermostatic electrical switch 83 which has a flexible elongated temperature probe 85 connected thereto. In the preferred embodiment, thermostatic electrical switch 83 comprises a Ranco brand thermostatic switch Model No. A46-3133 (which is preset to switch at approximately 32° F.), or a Cutler Hammer brand thermostatic switch Model No. 9533N409. In the preferred embodiment, thermostatic electrical switch 83 is mounted in the engine compartment of the classic car, preferably along the fire wall of the vehicle, out of sight. Flexible elongated temperature probe 85 is wrapped about outlet tube 25 of evaporator 21. Flexible elongated temperature probe 85 is held firmly in position about outlet tube 25 by operation of fastener 87. In the preferred embodiment, fastener 87 comprises a clamping fastener, of the type used in plumbing. This fastener includes an adjustment means 89 for enlarging or diminishing the size of the fastening loop. Thermally insulating material 91 is provided for wrapping around flexible elongated temperature probe 85 to insulate it from the heat generated by the vehicle engine. Thermally insulating material 91 ensures accurate measurement of the temperature of the refrigerant in evaporator 21. In the preferred embodiment, thermally insulating material 91 has an adhesive layer on one side, which interfaces with backing material 93 when in storage.

The kit of the present invention also includes two wires 95 for coupling thermostatic electrical switch 83 to clutch cycling system 17 of compressor 11. This allows thermostatic electrical switch 83 engage and disengage compressor 11 in response to the temperature of the refrigerant in evaporator 21. In the preferred embodiment, thermostatic electrical switch is electrically coupled by one wire 95 to the thermostatic switch control of the vehicle air conditioner, and with another wire 95 to the power line of the clutch coil. In this configuration, thermostatic electrical switch 93 can serve to cut off electrical power to the clutch coil to impede the operation of compressor 11. If the temperature of the gaseous refrigerant in evaporator 21 drops below 32° f., thermostatic electrical switch 83 interrupts power to the clutch coil of compressor 11, causing an increase in pressure of the refrigerant in evaporator 21, and corresponding increase in temperature. When the temperature rises above 32° F., thermostatic electrical switch 83 closes, causing electrical power to be directed to the clutch coil of compressor 11.

The kit of the present invention also includes connectors 99, 101 for connecting wires 95 to the appropriate terminals of the vehicle air conditioning system. In addition, the kit includes vacuum restrictors 97 which are placed in vehicle vacuum line 57 to obstruct the line. This is done to prevent the unnecessary weakening of the vehicle vacuum system, since the vacuum line is no longer needed for purposes of the suction throttling valve 27.

Figure 5:
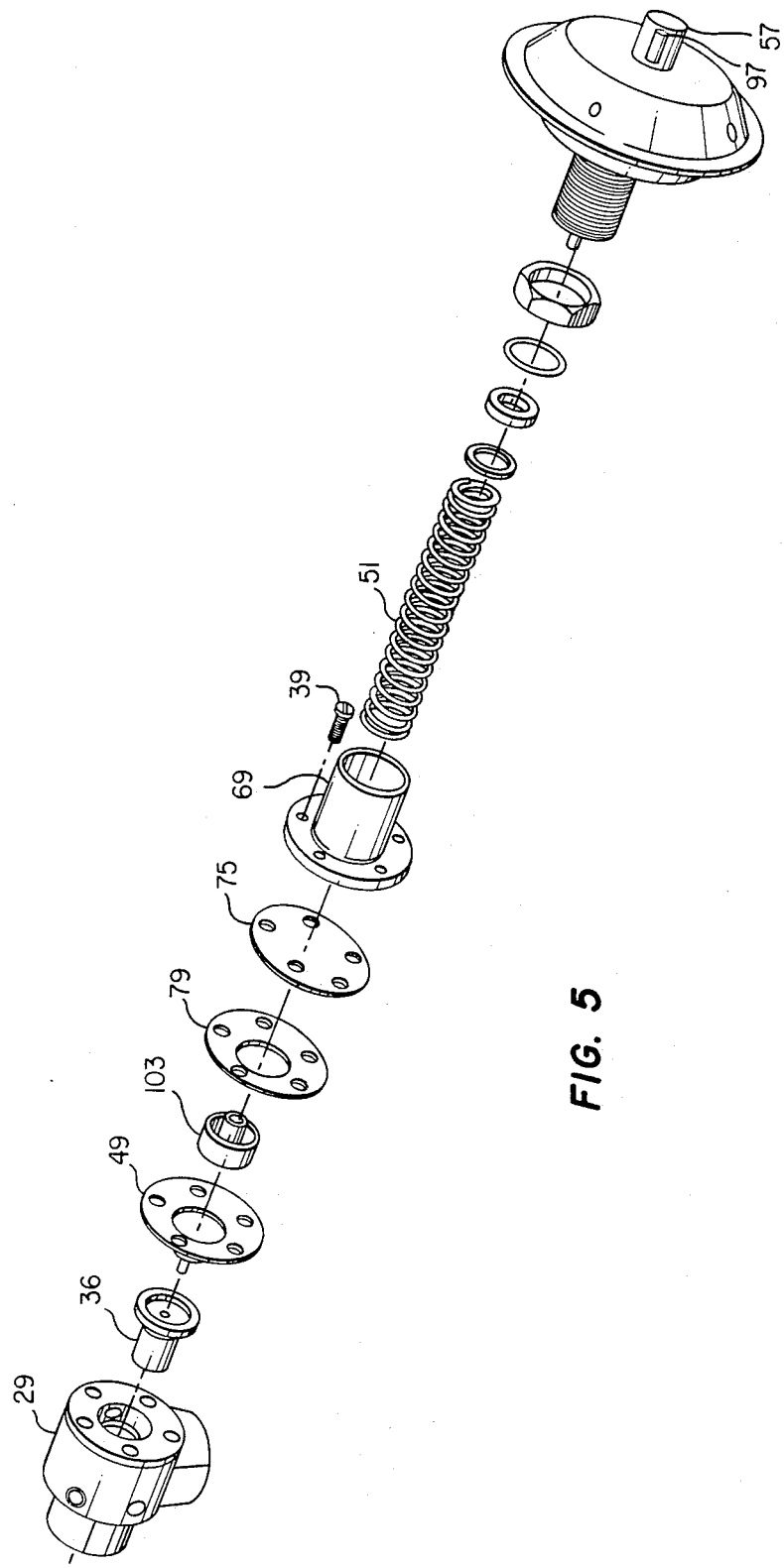
FIG. 5 is an exploded view of a suction throttling valve, graphically depicting the changes to be made to the valve.

FIG. 5 is a partial exploded view of suction throttling valve 27 which graphically illustrates the steps taken to modify suction throttling valve 27. Piston 36 and diaphragm 49 are removed from suction throttling valve 27 and discarded. Spring seat 103 may also be discarded. Planar rigid plate 75 and gasket 79 are positioned between diaphragm cover 69 and valve body 29 and secured in place by bolts 39, 41, 43, 45, and 47 (only bolt 39 is shown in FIG. 5). Adjustment spring 51 may also be discarded. Vacuum restrictor 97 is then placed in vehicle vacuum line 57.

Figure 6:
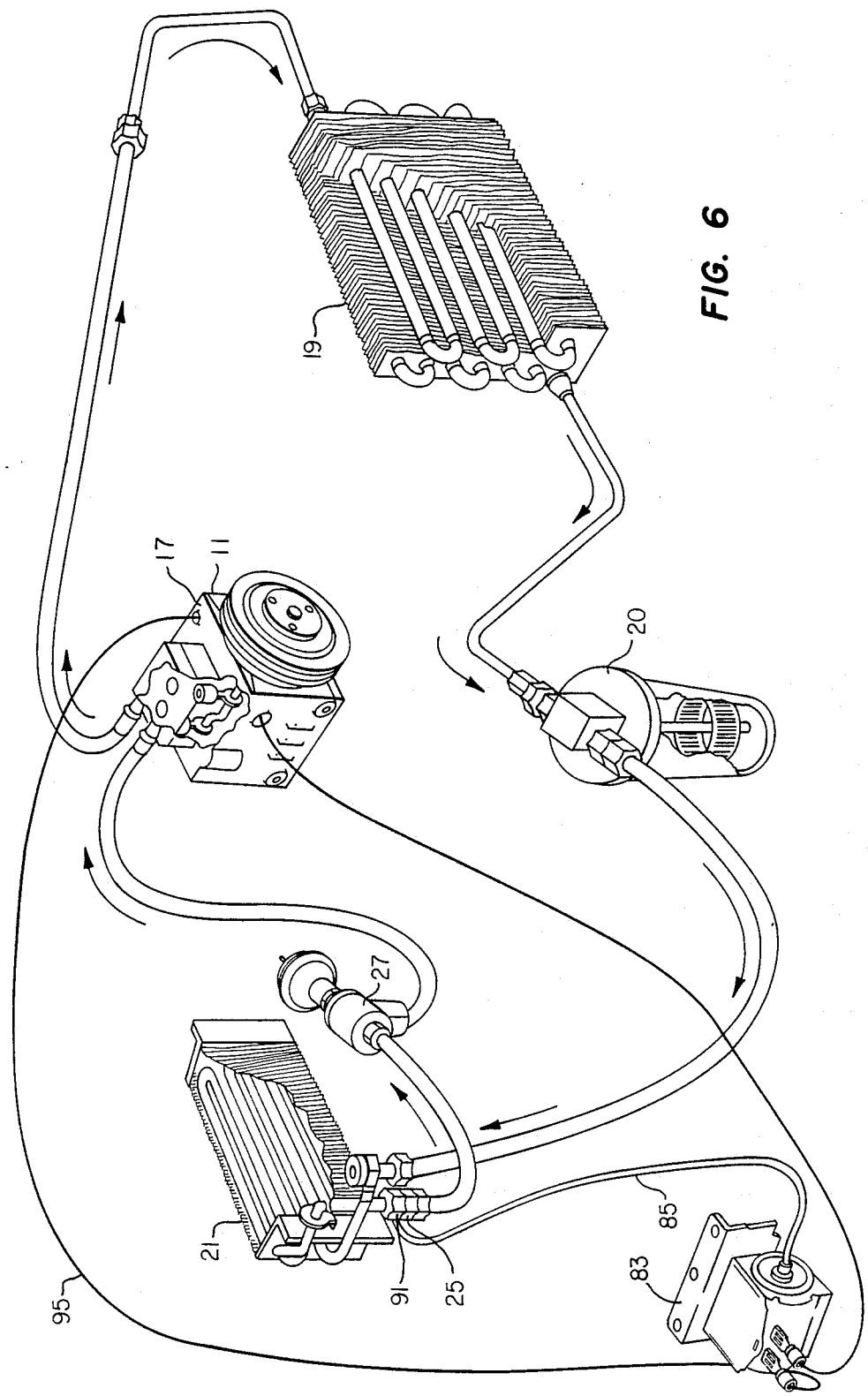
FIG. 6 is a simplified view of a vehicle refrigerant circuit modified according to the present invention.

FIG. 6 is a simplified view of the vehicle air conditioning circuit modified according to the present invention. Suction throttling valve 27 has been "gutted" and planar rigid plate 75 and gasket 79 have been placed between valve body 29 and diaphragm cover 69. Suction throttling valve 27 is thus no longer operational, and serves merely as a conduit for refrigerant. However, since the part remains intact, the automobile may be entered in competitive classic car shows, without losing points for lack of authenticity.

Thermostatic electrical switch 83 is mounted in the engine cavity, preferably out of sight. Flexible elongated temperature probe 85 is wrapped about outlet tube 25 of evaporator 21. Flexible elongated temperature probe 85 is mounted in place by fastener 87, and covered by thermally insulating material 91 to insulate the temperature probe from the heat generated by the engine.

Wires 95 couple thermostatic electrical switch 83 between the vehicle thermostatic switch control and the power line of the clutch coil of compressor 11.

The present invention allows for the improvement of the operating performance of the air conditioning system of certain classic cars, without destroying the authenticity of the classic car. The kit of the present invention allows for an easy conversion between a mechanical suction throttling valve and an electrical thermostatic switch. The electrical switch is less prone to failure, and should provide many years of trouble free operation, in contrast with the mechanical suction throttling valve which has proven to be prone to failure, and expansive to repair. The kit of the present invention allows for conversion without destroying the authenticity of the vehicle's air conditioning system.

As described above, pressure and temperature of the gas in the low pressure line leading out of the evaporator 21 are directly proportional. A pressure sensitive switch can be substituted for the thermostatic switch 83 to accomplish the same results described above. Such a switch operates by disengaging the compressor 11 when the pressure of the gas leaving the evaporator 21 drops below a predetermined level.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A kit for converting a suction throttling valve of a vehicle, which is coupled in an air conditioning circuit of said vehicle;

said automotive air refrigeration circuit including:
   a compressor for pressurizing a refrigerant, having a suction intake for receiving low pressure refrigerant in gaseous form, an output for discharging high pressure refrigerant in a gaseous form, and an electrically actuated clutch cycling system for engaging and disengaging said compressor, wherein said thermostatic switch selectively actuates said clutch cycling system to engage and disengage said compressor in response to changes in air conditioning temperature sensed by a temperature sensor in said vehicle;
   a condenser coupled to said compressor for receiving high pressure refrigerant in gaseous form said output of said compressor and discharging high pressure refrigerant in liquid form;
   an evaporator coupled to said condenser for receiving high pressure liquid refrigerant from said condenser and discharging refrigerant in the form of low pressure gas from an outlet tube into said suction intake of said compressor;
   wherein vehicle air is cooled as it is circulated over said evaporator, and wherein said suction throttling valve is coupled in said air conditioning circuit between said evaporator and said compressor to maintain pressure within said evaporator at a preselected level to prevent icing of said evaporator;

said suction valve including:
   a valve body having an inlet for coupling to said evaporator and receiving low pressure gaseous refrigerant discharged from said evaporator, and an outlet for coupling to said suction intake of said compressor, said inlet and outlet interconnected by a chamber;
   a piston disposed in said chamber, and adjustable in position within said chamber to control the flow of refrigerant between said inlet and said outlet of said valve body;
   an adjustment spring housing releasably coupled to said valve body;
   an adjustment spring disposed in said housing;
   a diaphragm coupled between said valve body and said adjustment spring housing, deformable in shape in response to the sum of forces from said adjustment spring on one side and refrigerant pressure in said evaporator on the other side, said diaphragm abutting said piston in said chamber to control the flow of refrigerant between said inlet and said outlet by adjusting the position of said piston within said chamber;
   an altitude compensation assembly coupled to said adjustment spring housing including a vacuum chamber coupled to a vehicle vacuum line, a vent chamber coupled to atmospheric pressure, a flexible barrier disposed between said vacuum and vent chambers, a rod extending through said adjustment spring housing and abutting said diaphragm at one end and said flexible barrier at the opposite end, a spring for biasing said flexible barrier inward and urging said rod to act upon said diaphragm in supplementation to said adjustment spring, wherein changes in altitude are automatically accommodated by said altitude compensation assembly; comprising:
   a plate for coupling in said suction throttling valve in place of said diaphragm between said valve body and said adjustment spring housing, after removal of said diaphragm and said piston from said suction throttling valve;
   a gasket for coupling between said valve body and said adjustment spring housing adjacent said plate to prevent leakage of refrigerant from said valve body;
   a thermostatic electrical switch having a flexible elongated temperature probe, for coupling to said vehicle adjacent said evaporator with said flexible elongated temperature probe in contact with said evaporator, wherein said thermostatic electrical switch is actuated in response to temperature of said evaporator sensed by said flexible elongated temperature probe;
   fastener means for securing said elongated temperature probe in place;
   thermally insulating material for wrapping around said flexible elongated temperature probe when coupled to said evaporator by said fastener means, to thermally insulate said flexible elongated temperature probe and ensure accurate measurement of evaporator refrigerant temperature;
   conductor means for electrically coupling said thermostatic electrical switch to said electrically actuated clutch cycling system of said vehicle for allowing said thermostatic electrical switch to disengage said compressor when the temperature of said evaporator falls below a selected level to prevent icing of said evaporator.

2. A kit for converting a suction throttling valve of a vehicle, according to claim 1 further comprising:
   means for obstructing said vehicle vacuum line proximate said altitude compensation assembly.

3. A kit for converting a suction throttling valve of a vehicle, according to claim 1, wherein said valve body and said adjustment spring housing are coupled by a plurality of bolts, and wherein said plate includes a plurality of mounting ports adapted to allow passage of said bolts.

4. A kit for converting a suction throttling valve of a vehicle according to claim 1, wherein said fastener means comprises a circular strap with an adjustment means for expanding an contracting said circular strap.

5. A kit for converting a suction throttling valve of a vehicle, according to claim 1, wherein said thermally insulating material has an adhesive on at least one side.

* * * * *